United States Patent  [15] 3,652,159
Lietar  [45] Mar. 28, 1972

[54] RANGEFINDER FOR MEASURING THE DISTANCE OF AN OBJECT HAVING A LUMINOUS SPOT

[72] Inventor: Christian Lietar, Yverdon Vaud, Switzerland

[73] Assignee: Paillard S.A., Sainte-Croix, Vaud, Switzerland

[22] Filed: Sept. 15, 1969

[21] Appl. No.: 857,813

[30] Foreign Application Priority Data

Sept. 27, 1968 Switzerland..........................14586/68

[52] U.S. Cl..................................................356/4, 250/204
[51] Int. Cl...........................................................G01c 3/08
[58] Field of Search....................356/4, 5, 109, 110; 250/204

[56] References Cited

FOREIGN PATENTS OR APPLICATIONS 449,985  4/1968  Switzerland..............................356/4
551,427  3/1957  Belgium....................................356/4

Primary Examiner—Richard A. Farley
Assistant Examiner—S. C. Buczinski
Attorney—Emory L. Groff and Emory L. Groff, Jr.

[57] ABSTRACT

A rangefinder for measuring the distance of an object having a luminous spot has a convergent optical receiving system for picking up rays from the spot and converging them on to a sensing device. This device has a mirror wherein the edges of the reflective surface thereof comprises a separator element including a peripheral separating line sensitive to the convergence of the rays, and is arranged substantially on the caustic of the optical receiving system at a point remote from the optical axis of the system. The system may be at least one annular portion of a convergent system devoid of its central part. The caustic may have a cusp for greater concentration of light on said edges of the reflective surface of the mirror. The converging system may be formed by at least a part of a ring of a convergent system of lenses or of a concave Mangin mirror. The light projection device may be located on the axis of the optical system and in front of the photosensitive device, in the case where the central part of the optical system is not used.

8 Claims, 1 Drawing Figure

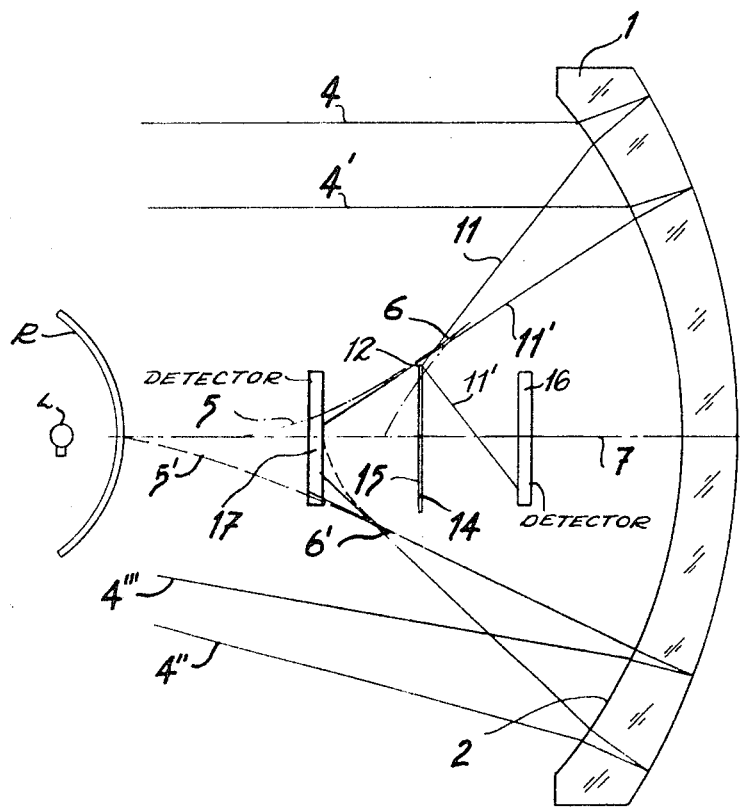
INVENTOR
CHRISTIAN LIETAR
BY Emory L. Groff Jr.
ATTORNEY

RANGEFINDER FOR MEASURING THE DISTANCE OF AN OBJECT HAVING A LUMINOUS SPOT

The present invention relates to a rangefinder for measuring the distance of an object having a luminous spot.

There are already known rangefinders for measuring the distance of an object having a luminous spot, comprising a receiving convergent optical system, intended to pick up rays from the spot and to make them converge on the line of separation of a device sensitive to the distance of convergence of the said rays.

Such a convergent optical system is illustrated and described in U.S. Pat. No. 3,558,894, assigned to the same assignee as the present application which is an improvement over the device of said patent. In general, the luminous spot is obtained by means of a projector directing a luminous beam on to the object whose distance it is desired to measure. By "luminous beam," there is understood any beam having the general characteristics of light, this term covering particularly the case of rays whose wave-length is outside the visible spectrum, that is to say ultraviolet or infrared rays.

In rangefinders of this type, the receiving optical system and the device sensitive to the distance of convergence of the rays present constructional problem relatively difficult to resolve.

In fact, good functioning of this type of range-finder requires luminous rays issuing from a point-object situated on the axis of the said system not converging on this axis, but on a separating line provided by the edges of the light sensitive device which must generally be spaced from the axis, this separating line being able to be continuous, discontinuous or even constituted by two distinct lines symmetrical with respect to the axis.

To realize this condition, the first solution which appears, is to use a receiving optical system, comprising one or several toroidal surfaces which then give, from a point-object situated on the axis, an image in the form of a circular line. But these toroidal surfaces are difficult to produce and consequently are of high cost.

It is an object of the present invention to provide a rangefinder in which toroidal surfaces are replaced by simple spherical surfaces which are easier to manufacture with precision and are less expensive.

Other objects and advantages will emerge from the description which follows.

According to the invention, there is provided a rangefinder, in which the edges of the reflective surface of a mirror of the sensitive device are arranged appreciably on the caustic of the receiving optical system, at a point remote from the optical axis of the said system.

In order that the invention may be more fully understood, an embodiment of a rangefinder according to the invention is described below purely by way of illustrative but non-limiting example, with reference to the accompanying schematic drawing.

Referring now to the drawing, a rangefinder comprises a convergent receiving optical system which is formed by a Mangin mirror 1. As is known, mirrors of this type are concave and have a spherical front surface 2 and a rear surface 3 similarly spherical. The rear surface along is reflecting, so that rays 4 reaching the mirror must pass twice through the thickness of the glass before being reflected towards the focus of the mirror. By suitable choice of the radii of curvature of the front and rear surfaces of the mirror, of the refractive index of the glass and of the thickness of the mirror, it is generally sought to correct the mirror so that the marginal rays are reflected with accuracy on to the focus of the mirror.

On the other hand, in the mirror shown, the parameters of the mirror are selected so as to obtain a caustic 5 having a cusp 6 at a point relatively distant from the optical axis 7 of the mirror. As is known, the caustic is an envelope-surface of rays reflected by the mirror.

The central part of the mirror 1 is covered by an opaque non-reflecting layer 8. Moreover, this mirror comprises a diametrical band, so that it only presents finally two reflecting portions 9, 10 diametrically opposite and arranged on both sides of the opaque layer 8.

The rays substantially parallel to the optical axis 7 striking the portion 9, and which are included between the extreme rays 4 and 4', shown in the drawing, are reflected as indicated at 11 and 11', and intersect in proximity to the cusp 6 of the caustic 5.

It is thus possible to locate the edge 12 of a separate element comprising a reflecting layer 15 deposited on a circular glass 14 at a spot where the luminous intensity is relatively high and where the cutoff point of the reflected rays 11 and 11' is substantially displaced as a function of the incidence of the rays 4 and 4' on the mirror. The light is thus, according to the distance of the object, received by the photosensitive element 17 or, after reflection on the reflecting layer 15, on the other photosensitive element 16. Thus it will be seen that the edges of the separator element or reflecting layer 15 split the luminous flux forming the cusp into two separate beams with the proportion of the luminous fluxes forming these beams being dependent upon the axial location of the separator element. Moreover, as the receiving optical system comprises two portions 9, 10 of the mirror, the edges 12 and 13 of reflecting surface 15 can be placed on the path of the reflected rays for each of the portions 9 and 10 of the mirror.

At the lower part of the drawing, there are shown extreme rays 4'' and 4''', arising from a point-object situated on the optical axis 7 close to the mirror 1. In this case the rays concerned are not parallel to the optical axis and after reflection define a caustic curve 5', having a cusp 6', which is in a different position along the axis from that presented by the rays 4 and 4' parallel to the optical axis.

In a specific example of the receiving optical system, the Mangin mirror has been produced from a glass having an index of refraction of 1.51 and a constringence or Abbe number of 64. The radius of curvature of the front surface is 89.6 mm. and that of the rear surface 118.2 mm. The maximum outer diameter is 112 mm., whilst that of the opaque layer 8 is 74 mm. The cut-off point of the reflected rays, in the case of rays 4 and 4' parallel to the optical axis, is then situated at 58.8 mm. from the bottom of the mirror and at 2.5 mm. outside the optical axis.

In general, rangefinders comprising a receiving optical system to pick up rays from a luminous spot are also provided with a projector, directing a beam on to the object whose distance it is desired to measure, to form thereon the said luminous spot. In the case illustrated in the drawing, as the central part of the mirror 1 is not used, it is possible to place the light source L and its reflector R on the optical axis 7 in from of the photosensitive element 17.

It is well understood that there can be provided numerous variations of the embodiment shown and that in particular the optical system could have more than two parts of a ring of a concave mirror, or even be formed by a complete ring. In this latter case, the image of a point-object would no longer be given in the form of two portions of arcuate lines, as in the case shown in the drawing, but in the form of a complete circular line.

Neither is it indispensable that the convergent system be constituted by a concave mirror, since it could very well be produced from receiving devices having similar operating conditions, these receiving devices including an annular part of a convergent system comprising one or several lenses, or again several portions of such an annular part. Neither is it necessary that the caustic of the receiving system have a cusp, but this feature is however advantageous, since it enables the obtaining of a greater concentration of light on the separating lines 12 and 13.

All such and other changes and modifications may be made in the embodiments described above, without departing from the essential concept of the invention as defined in scope by the appended claims.

I claim:

1. In a rangefinder for measuring the distance of an object having a luminous spot and wherein a convergent optical receiving system is adapted to pick up rays from said spot and to make them converge on an edge of a sensing device sensitive to the distance of convergence of the said rays, the improvement, wherein said convergent optical receiving system includes a portion of a Mangin mirror corresponding to a zone of said mirror for which the caustic forms a cusp, said sensing device including a separator element movable along the optical axis of said convergent optical receiving system to remain substantially adjacent the area generated by said cusp of said caustic when the distance of the object to be measured is varied within the useful range of the range finder, said separator element separating the luminous flux forming the cusp portion of said caustic into two separate beams with the proportion of the luminous fluxes forming the two beams being dependent on the position of said separator element with respect to that of the cusp portion of said caustic and said sensing device including photoelectric means adapted to detect the intensity of the luminous fluxes of the two beams separated by said separator element.

2. A rangefinder according to claim 1, wherein the convergent optical system is constituted by at least one annular portion of a convergent system devoid of its central part.

3. A rangefinder according to claim 2, including a light projection device located on the axis of the optical system and in front of the sensing device.

4. A rangefinder according to claim 1, wherein the convergent optical system is formed by at least a part of a ring of a convergent system of lenses.

5. A rangefinder according to claim 1, wherein the convergent optical system is formed by two diametrically opposite portions of a Mangin mirror.

6. A rangefinder according to claim 1, wherein the convergent optical system is formed by a ring of a convergent system of lenses.

7. A rangefinder according to claim 1, wherein the convergent optical system is formed by a ring of a concave Mangin mirror.

8. A rangefinder according to claim 1, wherein the Mangin mirror is produced of a glass having a refractive index of about 1.51 and an Abbe number of about 64.

* * * * *